(No Model.) 2 Sheets—Sheet 1.

E. L. WILLIAMS.
COMBINED HAY TEDDER AND RAKE.

No. 317,602. Patented May 12, 1885.

WITNESSES:
Chas. Maas.
G. Koehler.

INVENTOR:
Elmer L. Williams.
Per
James B. Lizius & Co.
Attorneys.

(No Model.) 2 Sheets—Sheet 2.

E. L. WILLIAMS.
COMBINED HAY TEDDER AND RAKE.

No. 317,602. Patented May 12, 1885.

WITNESSES:
Chas. Maas.
G. Koehler.

INVENTOR:
Elmer L. Williams.
Per James B. Lizius & Co.
Attorneys.

UNITED STATES PATENT OFFICE.

ELMER L. WILLIAMS, OF BUCHANAN, MICHIGAN.

COMBINED HAY TEDDER AND RAKE.

SPECIFICATION forming part of Letters Patent No. 317,602, dated May 12, 1885.

Application filed May 13, 1884. (No model.)

*To all whom it may concern:*

Be it known that I, ELMER L. WILLIAMS, a citizen of the United States, residing at Buchanan, in the county of Berrien and State of Michigan, have invented a Combined Hay Tedder and Rake, of which the following is a specification.

The objects of my invention are to provide a strong and substantial combined hay tedder and rake, in which all cog-gear and cog-wheels are avoided, which is easily transported, which, without much trouble or delay, can be changed from a tedder to a rake, and vice-versa, and one the tedder-forks of which in case of breakage can be easily replaced. I attain these objects by the mechanism illustrated in the accompanying drawings, in which—

Figure 1:
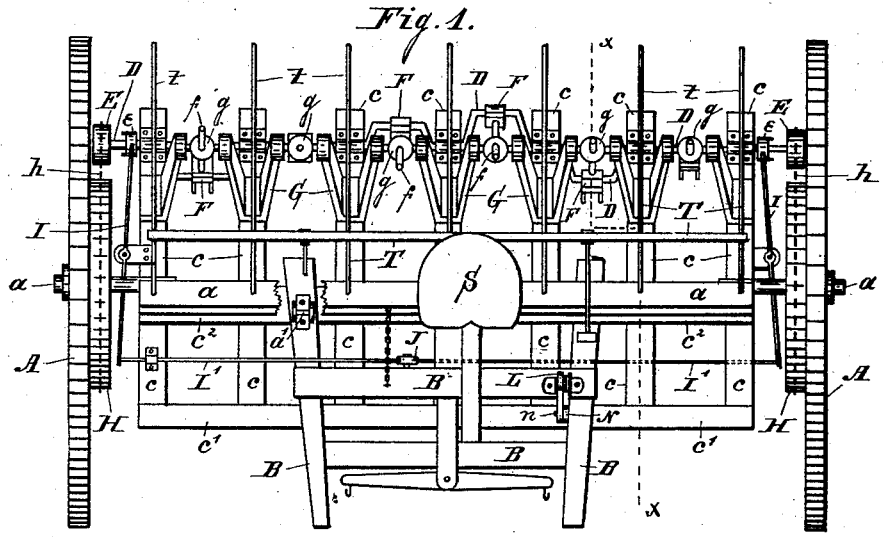
Figure 2:
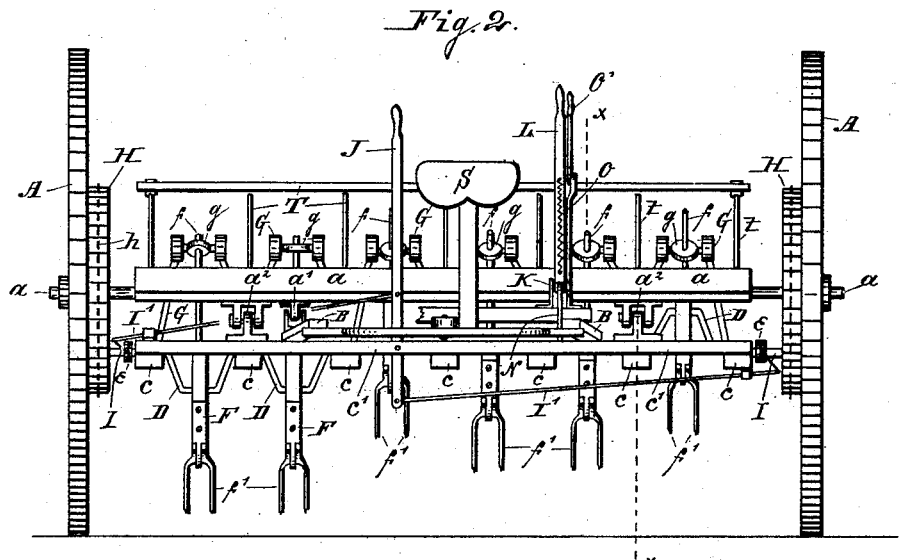
Figure 3:
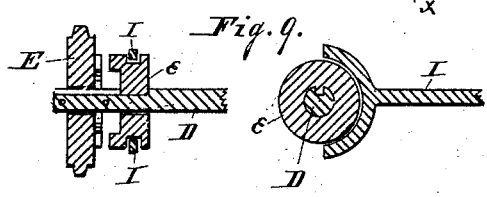
Figure 3:
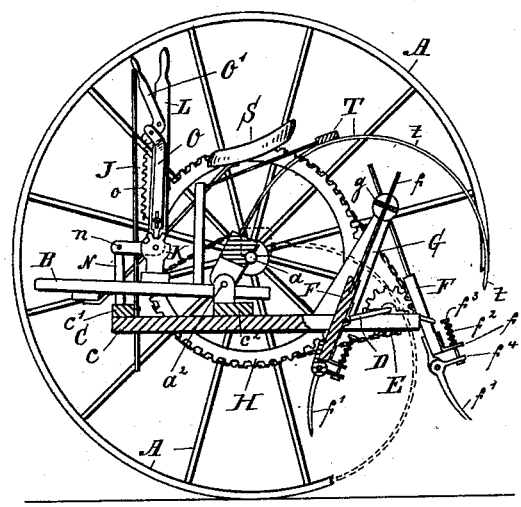
Figures 6, 7:
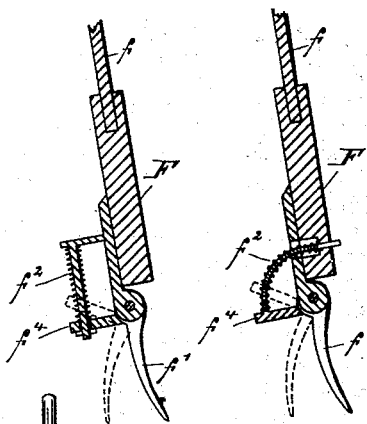
Figures 4, 5:
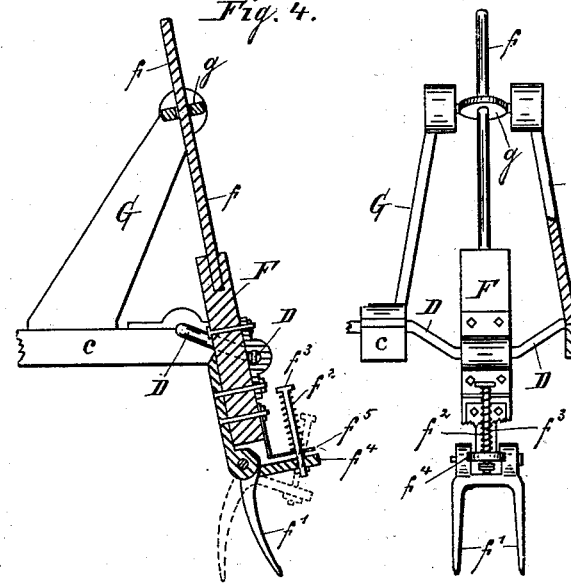
Figure 8:
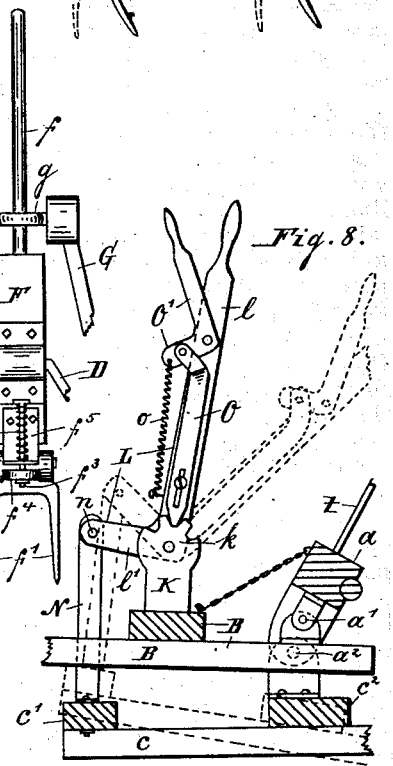

Figure 1 represents a top view or plan of the machine when ready for transportation; Fig. 2, a front view of the same; Fig. 3, a vertical cross-section through the machine on line $x$ $x$ on Figs. 1 and 2; Figs. 4 and 5, detail views of my improved tedder arms and forks; Figs. 6 and 7, modified methods of applying the spring which renders the tedder-forks flexible; Fig. 8, a detail view of the lever which lifts and dumps the tedder-forks; and Fig. 9, details of the sprocket-wheel on the shaft that operates the tedder-forks, and of the clutching device by which said wheel is made to operate said shaft.

Similar letters refer to similar parts throughout the several views.

$a$ is the main axle on which the wheels A A operate. To said axle $a$ is hinged at two points, $a'$ $a'$, at equal distances from the center, the frame B, which forms the tongue hounds or thills, and supports the driver's seat S.

To the axle $a$, which also forms the rake-head, are secured the teeth $t$ $t$ $t$ of the rake T. The rake T is raised above the ground or lowered by a chain or a lever connecting the axle $a$ and the frame B, the hinge-connections of the axle $a$ and the frame B permitting such motion; or the frame B may be rigidly connected to the axle $a$ and a separate rake-head hinged to said axle $a$, in which case the hinges will permit the raising or lowering of the rake-teeth.

To the axle $a$ is also hinged or linked at two points, $a^2$ $a^2$, at equal distances from the center, the tedder-frame C, which consists of the cross-beams $c'$ and $c^2$, and the longitudinal beams $c$ $c$ $c$, the linking-connection being at the beam $c^2$, which is located near the under side of the axle. By the rear ends of the longitudinal beams $c$ $c$ $c$ is supported the cranked tedder-shaft D which operates my tedder-arms F F. Said tedder-arms F F are constructed and operate as follows: The tedder-shaft D is mounted in journals on the beams $c$ $c$ $c'$. Between the beams $c$ $c$ $c$ the tedder-shaft D is bent to form cranks extending out in different directions in the different spaces, so that the rotary motion of the tedder-shaft D gives a walking-and-kicking motion to the tedder-arms F F, which are pivoted to the cranks formed upon the tedder-shaft D between the beams $c$ $c$ $c$.

To guide the motion of the tedder-arms F F, the brackets G G are secured to the beams $c$ $c$ at each side of the tedder-arms F F. Said brackets are connected at their upper ends by guide-plates $g$ $g$, pivoted to and between the brackets G G, and through the center of these plates work up and down the guide-rods $f$ of the tedder-arms F, the brackets G G forming journal-bearings for said plates $g$ and permitting the same to adapt itself to the varying position of the guide-rod $f$.

The tedder-arms F terminate in the tedder-forks $f'$, which are hinged to the arms F, and kept in a straight position by the spring $f^2$. Said spring $f^2$ is located in the rear of the arm F, and is coiled around a bolt, $f^3$, which passes through a flange, $f^4$, forming part of the tedder-fork $f'$, and through a bracket, $f^5$, rigidly secured to the tedder-arm F, the spring $f^2$ being coiled around the bolt $f^3$ above the bracket $f^5$, thus lifting the flange $f^4$ up and keeping the fork $f'$ in an upright position, but at the same time rendering it flexible, so that it will give and not break when coming in contact with a stone or any other hard substance.

In the figures 6 and 7 I show two modified methods of connecting the spring $f^2$ with the tedder-fork $f'$, in both cases the spring acting in front of the arm F, and pressing the flange $f^4$ down, and thus keeping the fork in position.

My tedder-forks operating in a walking-and-kicking fashion will stir and spread the hay to a greater advantage, and the forks being made flexible will prevent breakages, and should a breakage occur the forks can be easily detached and replaced without taking the machine apart or taking out the tedder-shaft.

On the ends of the tedder-shaft D are loosely mounted the sprocket-wheels E E, which are operated by chains h h from the large sprocket-wheels H H, rigidly secured to the driving-wheels A A, the sprocket-wheels E E running as idlers on said shaft D until engaged by the clutches e e, which clutches are keyed to the shaft D, and are shifted on the same by the lever mechanism I I' J.

I I are levers working horizontally on a fulcrum in the center, engaging the clutches e e at their rear ends, and connecting at the front ends with the cross-levers I' I', which being connected with the vertical lever-handle J at equal distances above and below a fulcrum-point enable the driver to engage or disengage the clutches e e with the sprocket-wheels E E, and to operate the tedder-shaft D at pleasure.

By the use of the sprocket-wheels H and E and the chain h, I avoid all cog-wheels which are liable to breakage and clogging, and consequently obtain a simpler and better machine than the ones now in use and operated by cog-wheels.

To raise and lower the tedder-shaft D and the tedder-forks $f'$ $f'$ the lever mechanism illustrated in figure 8 is employed.

To the hound-frame B is rigidly secured the fulcrum-support K, on which the lever L operates, the lever L having a long upright arm and handle, $l$, and a shorter horizontal arm, $l'$, to which is pivoted the lifting-rod N, which is secured to the cross-beam $c'$ of the tedder-frame C.

Sliding up and down on one side of the lever-arm $l$ is a pawl, O, which is connected at its upper end to the shorter arm of a small lever, O', said lever O' having its fulcrum-point and being pivoted to the lever-arm $l$ of the main lever L. The pawl O operates on a screw which passes through a slot in said pawl O into the lever-arm $l$. The shorter arm of the lever O', and the pawl O which is connected thereto, are held down by the spring $o$, secured to the shorter arm of the lever O' and to the arm $l$ of the main lever L near its fulcrum-point. The pawl O engages into a ratchet, $k$, forming part of the fulcrum-support K.

To raise or lower the rear part of the tedder-frame, the pawl O is raised out of the ratchet $k$ by pulling the lever O' toward the rear. The lever L is then thrown forward or backward, as the occasion demands, thus raising or lowering the front part, and correspondingly lowering or raising the rear part of the tedder-frame, the axle $a$ and the hinge-joints $a^2$ $a^2$ allowing such motion. The pawl O, dropping by the force of the spring $o$ into the ratchet $k$, secures and holds the lever and the tedder-frame in the desired position.

To disengage the hay-tedder from the rake the pintles are drawn out of the hinges $a^2$ $a^2$, the pin $n$, connecting the lever L and the lifting-rod N, is removed, and the chain $h$ is thrown off from the sprocket-wheel H. The hay-tedder then drops clear of the rake, which is ready for work.

What I claim, and desire to secure by Letters Patent, is—

1. In a combined hay tedder and rake, the combination of the axle $a$, the driving-wheels A A, the hounds or thills B, the rake T, the tedder-frame C, hinged to the axle $a$, the tedder-shaft D, the sprocket-wheels E E, mounted on said shaft D, the sprocket-wheels H H, secured to the wheels A A, the fulcrum-support K, secured to the hounds or thills B, the lifting-lever L, having its fulcrum in said support K, the lifting-rod N, connecting the lever L and the tedder-frame C, and the pawl-and-ratchet device O' O K $o$, forming means to hold the lever L in any desired position, all substantially constructed as described, and for the purpose specified.

2. The combination, in a hay tedder and rake, of the axle $a$, the wheels A A, the rake T, the thills and frame B, the tedder-frame C, the tedder-shaft D, forming cranks between its several bearings, the tedder-arms F F, journaled on said cranks, the forks $f'$ $f'$, pivoted to the arms F F, the springs $f^2$, so arranged as to hold the forks $f'$ in a vertical position and render the same flexible, the brackets G G, the guide-rods $f$, the guide-plates $g$, the driving mechanism H $h$ E, the clutching and lever mechanism $e$ I I' J, and the lifting device L K N, provided with the pawl and ratchet O' O $k$ $o$, all arranged and constructed as described, and for the purpose specified.

3. In a hay-tedder, the combination of the tedder-frame C, the tedder-shaft D, forming cranks between its several bearings, the tedder-arms F, journaled to said cranks, the brackets G G, the guide-rod $f$, secured to the tedder-arm F, the pivoted guide-plate $g$, between the brackets G G, through the center of which the tedder-rod $f$ is guided up and down, all arranged as described and specified.

4. In a hay-tedder, the combination of the tedder-frame C, the cranked tedder-shaft D, the tedder-arms F F, journaled to the cranks of said shaft D, the tedder-forks $f'$ $f'$, pivoted to the arms F F, the springs $f^2$ $f^2$, and the bolts $f^3$, so arranged as to hold the forks $f'$ $f'$ in a vertical position and render the same flexible, all constructed as described, and for the purpose specified.

5. In a hay-tedder, the combination of the tedder-frame C, the cranked tedder-shaft D, the arms F F, the forks $f'$ $f'$, pivoted to said arms F F, the springs $f^2$ $f^2$, the brackets G G, the guide plate $g$, pivoted between said brackets, and the guide-rods $f$ $f$, operating through the plate $g$, substantially as described and specified.

6. In a hay-tedder, the combination of the running-gear $a$ A A B, the tedder-frame C, the cranked tedder-shaft D, the tedder-arms F F, the forks $f' f'$, pivoted thereto, the springs $f^2 f^2$, arranged to hold said forks $f' f'$ in an upright position, the brackets G G, plate $g$, and rod $f$, forming a device for guiding the motion of the arms F F, the driving mechanism E $h$ H, the clutching device J I' I $e$, and the lifting and lowering mechanism L K N O' O $k$ $o$, all constructed and arranged as described, and for the purpose specified.

In testimony whereof I have signed my name to this specification in the presence of two subscribing witnesses.

ELMER L. WILLIAMS.

Witnesses:
 CHARLES MAAS,
 G. KOEHLER.